US010427029B2

(12) United States Patent
Kennedy

(10) Patent No.: US 10,427,029 B2
(45) Date of Patent: Oct. 1, 2019

(54) SMART BIN LOTTERY TICKET DISPENSER WITH MODULAR PRINTER BIN

(71) Applicant: Scientific Games International, Inc., Newark, DE (US)

(72) Inventor: James C. Kennedy, Roswell, GA (US)

(73) Assignee: Scientific Games International, Inc., Newark, DE (US)

( * ) Notice: Subject to any disclaimer, the term of this patent is extended or adjusted under 35 U.S.C. 154(b) by 55 days.

(21) Appl. No.: 15/843,109

(22) Filed: Dec. 15, 2017

(65) Prior Publication Data

US 2019/0184269 A1 Jun. 20, 2019

(51) Int. Cl.

*A63F 13/00* (2014.01)
*A63F 3/06* (2006.01)
*G07F 17/32* (2006.01)
*G07F 17/42* (2006.01)

(52) U.S. Cl.

CPC .......... *A63F 3/0655* (2013.01); *A63F 3/0665* (2013.01); *G07F 17/329* (2013.01); *G07F 17/3211* (2013.01); *G07F 17/42* (2013.01); *G07F 17/3216* (2013.01)

(58) Field of Classification Search

None

See application file for complete search history.

(56) References Cited

U.S. PATENT DOCUMENTS

| | | | | |
|---|---|---|---|---|
| D448,956 | S * | 10/2001 | Roberts | D6/515 |
| 6,356,794 | B1 | 3/2002 | Perin, Jr. et al. | |
| 7,665,394 | B2 | 2/2010 | Roberts et al. | |
| 7,850,257 | B2 | 12/2010 | Roberts et al. | |
| 8,454,436 | B2 | 6/2013 | Klostermann et al. | |
| 9,685,026 | B1 | 6/2017 | Garrison | |
| 2002/0166882 | A1 * | 11/2002 | Roberts | B05D 3/067 225/2 |
| 2003/0045340 | A1 * | 3/2003 | Roberts | A63F 3/0615 463/17 |
| 2006/0035698 | A1 * | 2/2006 | Roberts | B26F 3/002 463/17 |
| 2008/0055491 | A1 | 3/2008 | Gordon et al. | |

OTHER PUBLICATIONS

EP Search Report, dated Jun. 3, 2019.

* cited by examiner

*Primary Examiner* — Paul A D'Agostino
(74) *Attorney, Agent, or Firm* — Dority & Manning, P.A.

(57) ABSTRACT

A lottery ticket dispenser array includes a frame and a plurality of separate bins contained within the frame. Each bin includes a housing having a front side that faces a purchaser in operational use of the dispenser array, an opposite back side, and an internal space for receipt of a supply of interconnected lottery tickets, wherein each lottery tickets contains a code printed thereon. Each bin has an electronic drive mechanism that dispenses the lottery tickets therefrom. The bins are separately removable and insertable into the array. A printer module is provided in the array and has a size and configuration so as to be insertable into the array in place of at least one of the bins.

10 Claims, 2 Drawing Sheets

SMART BIN LOTTERY TICKET DISPENSER WITH MODULAR PRINTER BIN

BACKGROUND

In retail locations including, stores, such as grocery stores, general merchandise stores, and the like, the functional components necessary for the control and sale of lottery tickets are generally located at or close to the check-out counter or station because the ticket purchase and dispense process is typically the responsibility of the clerk or other employee at such location. For this reason, the lottery terminal, printer (for printing on-demand tickets such as draw game tickets (e.g. Powerball™ tickets) and instant-win tickets), scanner, and ticket dispenser (for storing and dispensing instant scratch-off lottery tickets) are generally located on or under the counter adjacent the check-out register so as to be readily accessible by the clerk. However, space (e.g. "real estate") on or near the check-out counter is extremely limited and valuable, and it is disadvantageous to the retailer to use such space unnecessarily for lottery system components.

Where instant scratch off lottery tickets are sold, various configurations of lottery ticket dispensers have been proposed in the industry for this purpose, including electronic dispensers that automatically dispense a ticket from a bin or compartment upon receipt of an electronic command signal. Although useful, these dispensers are relatively large and take up valuable space on or near the check-out counter. The other functional components required for the processing and sale of draw game tickets or instant on-demand tickets, such as the terminal and printer, are stand-alone components and must also be accommodated at or near the check-out counter.

In addition, conventional electronic lottery ticket dispensers are configured with a controller or control terminal that is remote from the physical ticket array and connected to the array via power and/or data lines. Such controllers or terminals must also be readily accessible to the clerk or other employee and are thus also generally located on or near the check-out register counter, which only further exacerbates the space issue.

It would be beneficial to the industry and retailers alike to provide a more versatile lottery ticket system that services both instant scratch-off tickets and on-demand printed tickets while having a minimal space footprint at or near the check-out register.

SUMMARY

Objects and advantages of the invention will be set forth in part in the following description, or may be obvious from the description, or may be learned through practice of the invention.

In accordance with aspects of the invention, a lottery ticket dispenser array is provided for dispensing scratch-off (or other preprinted lottery tickets) and on-demand printed lottery tickets at a retail establishment. The type of retail establishment may vary widely within the scope and spirit of the invention. For example, in certain embodiments, the retail establishments may be convenience stores, gas stations, pubs, and any other establishment that typically sells lottery tickets to the public. The present array has particular usefulness for much larger retail establishments, such as "big-box" retail stores that are part of a national or other geographic chain, wherein the sale of lottery ticket sales has generally not been implemented.

The lottery ticket dispenser array includes a frame and a plurality of separate bins contained within the frame, for example an array of 3×4 separate bins, wherein each bin is defined by a housing having a front side that faces a purchaser in operational use of the dispenser array, an opposite back side that faces the retail vendor or clerk. Each bin has a defined first internal space for receipt of a supply of interconnected lottery tickets therein, such as a fan-folded stack or roll of interconnected lottery tickets. Each bin may contain a supply of different scratch-off lottery ticket games, or two or more bins may contain a respective supply of tickets for the same game. The lottery tickets typically include a machine readable code printed thereon that includes unique ticket identification information, such as an alpha-numeric code, bar code, QR code, or the like.

Each bin in the array includes an electronic drive mechanism that, when activated, dispenses one or more lottery tickets from the bin (depending on the number of tickets requested by the patron) in a dispense cycle.

The bins are modular in nature in that each bin is separately removable and insertable into the array.

The array includes a printer module having a size and configuration so as to be insertable into the array in place of at least one of the bins. The printer module may be insertable into the array at any location where one of the bins is located in the array.

The printer module may also include an integral scanner that is used for various known functions related to the sale and redemption of lottery tickets.

In a desirable embodiment, the individual bins and the printer module are controlled by a common controller. This common controller may be in communication with each of the drive mechanisms to initiate a dispense sequence for a scratch-off lottery ticket from one or more of the bins, as well as in communication with the printer module to initiate printing of an on-demand lottery ticket.

The controller may be variously configured within the scope and spirit of the invention. For example, the controller may comprise an input device, such as a keypad or touch pad, for manual entry of a ticket dispense command to one of the bins or the printer module.

The controller can be configured on the frame and variably positional relative to the frame between different operational positions. For example, in a particular configuration, the controller is slidable along a bottom, top, or side member of the frame between the different operational positions. The dispenser array may include a power/data tether or slide connection configured between the controller and respective side member of the frame for this purpose.

In certain embodiments, the controller can be pivotally mounted to the frame, as well being slidable along the frame. For example, the controller may be slidable along a bottom or side member of the frame between the different operational positions and be pivotal relative to the frame at each of the different operational positions.

In one embodiment, the controller is slidable along a side member of the frame and pivotable to a storage position essentially flush against the side member of the frame.

The controller may be configured to generate a bin ID signal upon a lottery ticket being dispensed from one of the bins, wherein the controller is in communication with a central lottery server and transmits the bin ID signals to the central lottery server. With this configuration, each lottery ticket within the bins includes a code printed thereon that uniquely identifies the lottery ticket, and each bin further comprises a scanner disposed to read the code as the lottery tickets are dispensed from the bin, the bin ID signal also containing the unique ticket code. The central lottery server may perform any manner of accounting, verification, tracking, billing, or other function with the unique ticket codes.

In certain embodiments, the controller and printer module are in communication with a central lottery server for any number of control, accounting, inventory, or other functions related to the sale of lottery tickets at the retail establishment.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the appended figures, in which:

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

Figure 1:
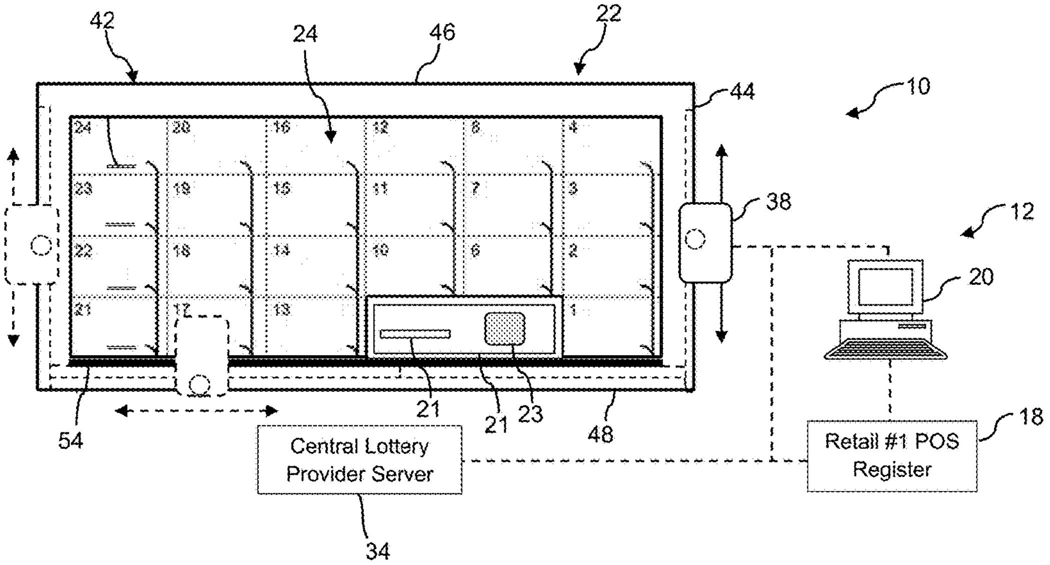
FIG. 1 is a diagram of a lottery ticket dispenser array in accordance with aspects of the present invention.

FIG. 1 depicts an embodiment of a system 10 and associated lottery ticket dispenser array 22 for dispensing lottery tickets 14 (FIG. 2) at a retail establishment 12. Although not a limitation, such tickets 14 may be conventional scratch-off lottery tickets known in the industry. As mentioned above, the type of retail establishment 12 may vary widely within the scope and spirit of the invention. A retail establishment or location 12, such as a retail store, convenience store, pub, restaurant, or the like, is generally authorized by a lottery jurisdiction to carry out lottery activities, such as the sale of instant scratch-off tickets or terminal printed draw tickets for games such as Powerball™. The lottery jurisdiction may be a state lottery authority, such as the Pennsylvania Lottery, or any other governmental jurisdictional authority. A separate game provider may be partnered with the lottery jurisdiction to provide certain control, implementation, and logistical functions of the game. It should be appreciated that the type of retail establishment 12 or lottery jurisdiction entities are not limiting factors of the invention. Although not limited to such, the present system 10 has particular usefulness for larger retail establishments, such as "big-box" retail stores that are part of a national or other geographic chain.

The retail establishment 12 may include one or more retail point-of-sale (POS) registers 18 wherein patrons of the establishment 12 purchase goods. Typically, a scanner is associated with the POS register 18 to scan a UPC code on the products, with the UPC code linked to a purchase price and identification of the products, as is well-known in the art.

Still referring to the embodiment of FIG. 1, the lottery ticket dispenser array 22 includes one or a plurality of individual lottery ticket bins 24, with each bin 24 typically containing a different respective lottery ticket game. For example, one bin 24 may contain "Lucky 7" themed scratch-off lottery tickets 14, while an adjacent bin 24 may contain "Gold Rush" themed scratch-off lottery tickets 14, and so forth. Each lottery ticket 14 in the different bins may include a machine readable code printed on a front or back side thereof, such as an alpha-numeric code, bar code, QR code, or the like. The type of code may vary depending on the desired information content of the code, space on the ticket 14, and so forth. The use of such codes on lottery tickets 14 for various functions related to inventory, identification, verification, and security are well-known. In accordance with aspects of the invention, the lottery tickets in each bin 24 are generally loaded as a fan-folded stack or roll of sequentially numbered tickets, wherein the machine readable code on each lottery ticket 14 contains this number (as well as any manner of additional ticket information), for example in the form of a serial number embedded in the code.

Referring again to FIG. 1, the dispenser array 22 includes a frame 42 in which the individual bins 24 are contained. The frame 42 may be integrally formed or may include several separate members fixed together, and can be made of plastic, wood, or any other suitable material. In general, the frame 42 includes a top member 46, a bottom member 48, and opposite side members 44.

Figure 4:
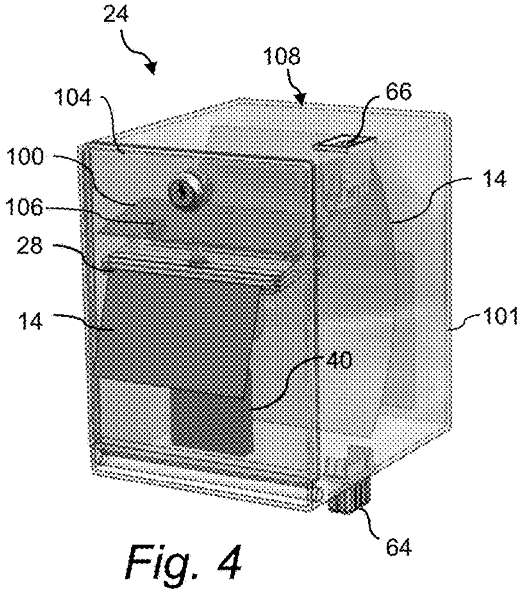
FIG. 4 is a front perspective view of a lottery ticket bin in accordance with the invention.
Figure 5:
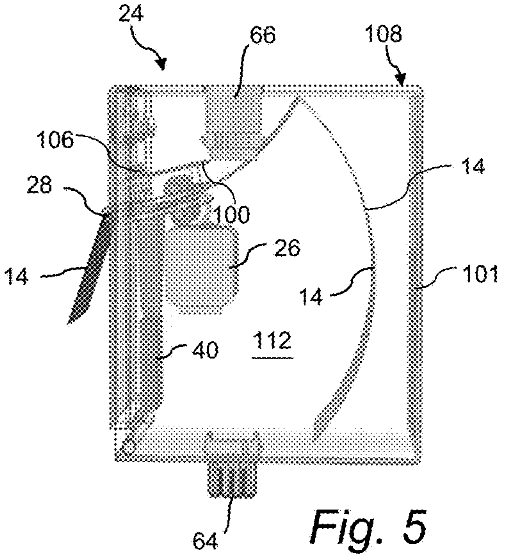
FIG. 5 is a side view of the bin embodiment of FIG. 4.

Referring to FIGS. 4 and 5 in particular, each of the individual bins 24 includes a multi-sided housing 108 defining an internal space 112 in which the stack or roll of lottery tickets 14 is stored. The housing 108 may be a box-like member having top and bottom walls, side walls, a front wall 101, and a pivotal back wall or panel 104. The back panel 104 swings open to provide access into the housing 108 for loading the stack of tickets 14. Each bin 24 may include a sample ticket 14 or other identifying insert attached to a front wall 101 of the bin 24 that faces the patrons so that the patron is aware of the exact tickets 14 available for purchase from the array 22. Various connectivity features may be configured between the bins 24. For example, each bin 24 includes a male power/data connector 64 on the top or bottom surface, and a corresponding female power/data connector 66 on the opposite surface, as seen in FIGS. 5 and 6. With this configuration, a plurality of the bins 24 can be vertically stacked and interconnected, as depicted in the various figures.

Still referring to FIGS. 4 and 5, each bin 24 in the dispenser array 22 includes an electronic drive mechanism 26 that, when activated, dispenses one or more lottery tickets 14 from the bin 24 (depending on the number of tickets requested by the patron). This drive mechanism 26 may include a motor that drives a friction roller, wherein the tickets 14 are engaged between the friction roller and an idler roller such that driven rotation of the friction roller causes the tickets 14 to be advanced through a dispensing slot 28 in a wall of the individual bin 24. The drive mechanism 26 may also include a sensor 106 that detects a leading and/or trailing edge of adjacent tickets 14 so as to control the run time of the drive mechanism 26 to ensure that perforations between the tickets 14 are presented at a tear bar or other cutting mechanism adjacent to the dispensing slot.

For example, such a sensor may be an optical sensor that detects the perforation line between adjacent tickets. Alternately, the friction or idler roller may include an electrical or mechanical encoder that indirectly measures the length of a ticket passing between the rolls as a function or rotations of the roller. In another embodiment, a timing circuit may control the dispense cycle as a function of run time of the motor. It should be appreciated that the drive mechanism 26 may be variously configured to perform the functions of dispensing the requisite number of tickets 14 from the individual respective bin 24 within the scope and spirit of the invention.

In certain embodiments, each bin 24 also includes a scanner 40 disposed so as to read the code on the lottery tickets 14 as they are dispensed from the bin 24. The scanner 40 may be any conventional barcode reader, such as linear scanner, laser scanner, LED image scanner, and so forth. The tickets 14 are loaded into the bins 24 such that the code printed on each ticket passes within the detection field of the scanner 40. An integral (or separate) reader is configured with the scanner 40 to decode the scanner signal.

Each bin 24 may include a control board 100 having logic circuitry to control the various components within the bin 24, such as the leading edge sensor 106, drive motor timing circuit, electronic displays 107, 109, and so forth. Any manner of control or power components can be mounted on the board 100 for operation of the individual bins 24 as described herein.

The architecture of each bin 24 and the array 22 can vary within the scope of the invention. For example, the dispenser array 22 may include a bottom row of bins 24 having interconnected base structures 58, wherein each base structure 58 may include a male power plug and male data plug along one side, and a female power port and female data port along the opposite side. The plugs and ports of adjacent base structures 58 interconnect to essentially define a data/power bus 54 (FIG. 1) running the length of the base structures 58. An exposed power port and data port at one or both of the ends of the interconnected base structures 58 are available for connection with a power and data cord that are in communication with a controller 38, which may be a stand-alone component or configured with the array, as described in greater detail below.

The individual bins 24 are modular in nature in that they can be separately inserted into and removed from the array. Each bin 24 is in communication with the controller 38 via the data bus 54 due to the interconnectivity of the bins 24, as discussed above.

In a particular embodiment, the frame 42 may include a matrix of individual plug-in ports, for example on a wall of the frame 42, wherein each bin 24 has a connectivity plug that mates with a respective port in the frame 42 when the bin 24 is inserted into the frame 42. All of the ports can be in communication with the controller 38 through a common data/power bus.

Figure 2:
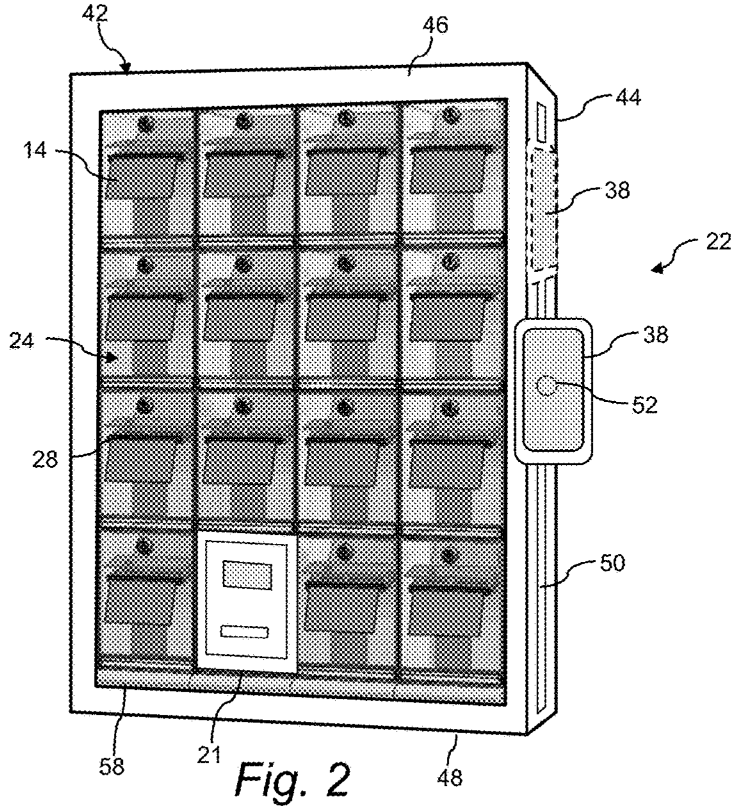
FIG. 2 is a front perspective view of a dispenser array in accordance with aspects of the invention.
Figure 3:
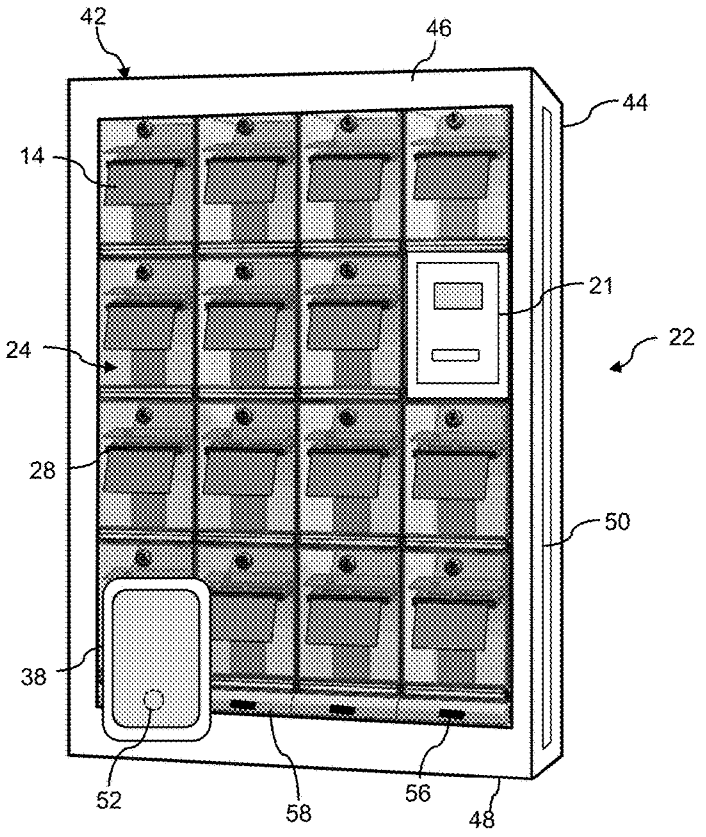
FIG. 3 is a front perspective view of an alternative dispenser array in accordance with aspects of the invention.

Referring to FIGS. 1 through 3, the array 22 includes a printer module 21 having a size and configuration so as to be insertable into the array in place of at least one of the bins 24. The printer module 21 is provided for printing "on-demand" lottery tickets, such as draw game tickets (Powerball™ tickets) or instant win tickets. The term "on-demand" is meant to encompass any type of lottery ticket that is printed at the retail establishment at the time of purchase of the ticket. The printer module 21 dispenses the printed tickets from a slot 21.

The printer module is also modular in nature in that it is insertable into the array at any location where one or more of the bins 24 is located in the array. For example, in the embodiment of FIG. 1, the printer module 21 has a size and configuration so as to displace two adjacent bins 24 from the array 22 at any location within the array 22. In the embodiments of FIGS. 2 and 3, the printer module 21 has a size and configuration so as to displace a single bin 24 from any location within the array 22.

As depicted in the figures, the printer module 21 may also be configured with a scanner that is used to scan barcodes or other identifying marks on the lottery tickets 14 dispensed from the array 22, printed by the printer module 21, or presented to the retail clerk for redemption or verification. The functionality and uses of such scanners for lottery ticket transactions is well-known in the industry.

As mentioned, the individual bins 24 and the printer module 21 can be in controlled by a common controller 38, which may be a remote stand-alone component. In a desirable embodiment depicted in the figures, the controller 38 is configured as an integral component of the array 22. For example, the controller 38 may be configured on a member of the frame 42 and variably positional relative to the frame 42 between different operational positions. As depicted by the various controllers 38 in FIG. 1, the controller may be slidable with a slot 50 defined along the bottom 48, top 46, or either side member 44 of the frame 42 between the different operational positions. This allows the controller 38 to be positioned by the retail clerk at a height that is suitable for the clerk and at a position relative to the frame 42 that does not interfere with other retail functions or processes at or near the retail counter.

The controller 38 may have a power/data port or plug that connects to a power/data line contained within the frame members 44, 46, 48. The controller 38 may be readily detachable from the power/data line so as to be easily repositioned on the frame 42. For example, a certain clerk may prefer for the controller 38 to be positioned on the left-hand frame side member 44, while another clerk prefers the controller on the top frame member 46 or right-hand frame side member 44. Any suitable locking or retarding device may be used to fix the controller 38 in position along the respective frame member 44, 46, 48.

In an alternate embodiment, the power/data connection with the controller 38 may be via contacts on a member of the controller 38 that extends into the slots 50 and slidably engage against strip conductors disposed along (and within) the respective frame member 44, 46, and 48.

The controller 38 can be pivotally mounted to the frame 42, as well being slidable along the frame 42. Any suitable universal or rotatable mount 52 may be used for this purpose. For example, the controller 38 may be slidable along a bottom 48 or side member 44 of the frame 42 between the different operational positions and, once positioned along the frame, pivoted relative to the frame 42 via the mount 52 to any desired orientation relative to the frame 42.

FIG. 2 depicts an embodiment wherein the controller 38 is slidable within slot 50 to any desired operational position along the frame side member 44. The mount 52 permits the controller 38 to be pivoted to a storage position essentially flush against the side member 44, as depicted by the phantom controller 38 in the figure. This embodiment may be desired in that the retail clerk can move the controller 38 to the storage position when not needed for dispensing tickets from the array 22.

FIG. 3 depicts an embodiment wherein the controller 38 can be positioned between different operational positions along the bottom member 48 of the frame 42. The controller 38 includes a male or female power/data port that connects to one of the complimentary connections 56 located along the bottom side member 48 or on one of the bin base structures 58. This configuration allows the controller 38 to be plugged and unplugged from the various connections 56 depending on the retail clerk's preference. The controller 38 may include a tray component that mates with the connections 56, wherein the controller 38 is variably positionable in the tray via a hinge member that also allows the controller 38 to fold essentially flat into the tray for storage when not in use. The entire tray (with controller 38) may be disconnected from the frame 42 for longer term storage.

The controller 38 is in communication with the printer module 21 and each of the drive mechanisms 26 via the power/data connections discussed above to initiate a dispense or print sequence upon receipt of a ticket dispense command from the controller 38. The controller 38 is configured with a user interface, such as a keypad or touchscreen, wherein the retail clerk can manually enter the patron's ticket request for an instant scratch-off ticket from one or more of the bins 24 or an on-demand ticket from the printer module 21. Alternatively, the dispense command may be routed through the controller 38 from the POS register 18 or from a separate lottery terminal 20, as depicted schematically in FIG. 1.

For certain downstream accounting and inventory functions, the controller 38 may be configured to generate a bin ID signal upon a lottery ticket 14 being dispensed from a respective bin 24, wherein the bin ID signal identifies the array 22 and the particular bin 24 within the array. This signal may be generated, for example, when the controller 38 or component within the bin 24 senses that a lottery ticket 14 has actually been dispensed from the bin 24 by any suitable detection process.

As mentioned, FIG. 1 depicts a separate lottery ticket terminal 20 that may be used for processing and dispensing on-demand lottery tickets from the printer module 21, or for initiating and routing a request of an instant scratch-off ticket to the controller 38. The terminal 20 can be configured in wired or wireless communication with the retail POS register 18, as well as with the controller 38. The controller 38 could also be in wired or wireless communication with the printer module 21 and function as the on-demand ticket terminal 20 (as discussed above), thereby eliminating a lottery system component from the retail space. In other words, the controller 38 would not only function to dispense scratch-off lottery tickets from the array 22, but could also be configured with the functionalities of the terminal 21 for processing on-demand ticket requests.

In an alternate system configuration, a request for purchase of a particular lottery ticket 14 from one of the bins 24 in the array 22 or for an on-demand ticket from the printer module 21 may be input directly to the controller 38 via the POS register 18. This configuration is versatile in that the clerk can perform ticket purchase functions at various locations in the retail space.

The scanner 23 in the printer module 21 may be used by the retail clerk to scan a "master" card having a code corresponding to the particular lottery ticket 14 requested by the patron. Thus, a master card or master code would be provided for each type of lottery ticket 14 offered by the establishment 12.

Referring to FIG. 1, a central lottery server 34 is in communication with the controller 38 (directly or via the terminal 20 or POS register 18), wherein the bin ID signals discussed above are transmitted to the central lottery server 34 for each dispense cycle. A plurality of the dispenser arrays 22 located over a wide geographic region may be in communication with the central lottery server 34. For each bin 24, the controller 38 may be in communication with the scanner 40 and specifically configured for receipt of the scan signal from the scanner 40. The controller 38 can append or otherwise incorporate the unique ticket code with the bin ID signal, wherein central lottery server 34 may perform any manner of accounting, verification, tracking, billing, or other function with the unique ticket codes. For example, the central lottery server 34 may include a database of all tickets delivered to the respective retail establishments 12, and the near instantaneous identification of dispensed/sold lottery tickets 14 to the server 34 enables various desired functionalities. For example, the individual lottery tickets 14 may remain "inactive" in the lottery provider's system (and thus unable to be redeemed) until individually activated by the central lottery server 34 as they are dispensed and sold. Thus, fraudulently obtained tickets (e.g., stolen or otherwise illegally obtained) cannot be redeemed. This is contrary to a conventional practice of activating entire books ("packs") of tickets upon delivery to a retail establishment 12.

The present system 10 allows for enhanced accountability of lottery tickets 14 sold at a particular retail establishment 12 by logging each ticket as it is sold and dispensed. The number of tickets 14 sold during a work shift (or other time period) is easily determined by generating a report by the central server 34 of the tickets sold at any of the retail establishments during any defined time period. The number of tickets 14 sold at any of the retail establishments 12 can be readily reconciled with tickets delivered to the establishment. Likewise, the number of tickets 14 dispensed during a defined time can be readily and electronically reconciled with reported purchase transactions from the respective establishment 12, with discrepancies being immediately identified for further investigation.

Another particular advantage of the system 10 and associated method is that billing practices between the retail establishments 12 and lottery authority, the lottery service provider, or ticket manufacturer can be based on real-time sales of the lottery tickets 14. For example, the retail establishments 12 can be invoiced on a periodic basis (e.g., daily or weekly) for the actual number of tickets sold (dispensed) at each respective establishment based on the signals 32 routed to the central lottery server 34 instead of upon delivery, or other payment methodology typically in use today. These include but are not limited to consignment for a predetermined time period, or estimate of sales based on the number of winning tickets cashed from a pack of tickets being sold.

It should be appreciated that the terms "server" is used herein to encompass any configuration of computer hardware and software that is maintained by a lottery authority or game provider to carry out the functionalities of the present system 10 and associated method, as well as any manner of additional lottery functions known to those skilled in the art. It should be readily appreciated that the server 34 may include an integrated server, or any manner of periphery server or other hardware structure. The central lottery server 34 is typically remote from the retail establishments 12, and is in communication with the establishments 12 via a suitable secure communication network, which may include any manner of wide area network, wireless internet, or cloud computing. The server 34 may be a single networked computer, or a series of interconnected computers having access to the communications network via a gateway or other known networking system. Generally, the server 34 is configured to communicate with, manage, execute and control individual lottery terminal units 20 within the lottery jurisdiction. The server 34 may be a "front end" server provided by the lottery game provider that is interfaced with the existing draw/instant game system infrastructure one or more separate lottery authorities. The server 34 may include a memory for storing gaming procedures and routines, a microprocessor (MP) for executing the stored programs, a random access memory (RAM) and an input/output (I/O) bus. These devices may be multiplexed together via a common bus, or may each be directly connected via dedicated communications lines, depending on the needs of the system 10.

The server 34 may be directly or indirectly connected through an I/O bus to any manner of peripheral devices such as storage devices, wireless adaptors, printers, and the like. In addition, a database (DB) may be communicatively connected to the server 34 and provide a data repository for the storage and correlation of information gathered from the individual dispenser arrays 22, such as the identity of each lottery ticket 14 dispensed from the array, the time of the dispense sequence, confirmation of ticket activation, and so forth.

It should be appreciated that embodiments of systems 10 and dispenser arrays 22 disclosed herein may be executed by one or more suitable networked lottery gaming components and establishment components (e.g., POS register 18, back office server, and so forth) within a plurality of the establishments 12, as well as the remote central server 34. Such gaming systems and computing devices may access one or more computer-readable media that embody computer-readable instructions which, when executed by at least one computer, cause the computer(s) to implement one or more embodiments of the methods of the present subject matter. Additionally or alternatively, the computing device(s) may comprise circuitry that renders the device(s) operative to implement one or more of the methods of the present subject matter. Furthermore, components of the presently-disclosed technology may be implemented using one or more computer-readable media.

As mentioned above, aspects of the present system 10 and methods rely on the transmission of data over one or more communications networks. It should be appreciated that network communications can comprise sending and/or receiving information over one or more networks of various forms. For example, a network can comprise a dial-in, public switched telephone network (PSTN), a local area network (LAN), wide area network (WAN), the Internet, an intranet or other type of network. A network may comprise any number and/or combination of hard-wired, wireless, or other communication links.

The material particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed is:

1. A lottery ticket dispenser array, comprising:

a plurality of separate bins arranged within a frame, each bin defined by a housing having a front side that faces a purchaser in operational use of the dispenser array, an opposite back side, and an internal space for receipt of a supply of interconnected lottery tickets, wherein each lottery ticket contains a code printed thereon;

each bin having an electronic drive mechanism that dispenses the lottery tickets therefrom;

wherein the bins are separately removable and insertable into the array; and a printer module having a size and configuration so as to be insertable into the array in place of at least one of the bins.

2. The lottery ticket dispenser array as in claim 1, wherein the printer module is insertable into the array at any location where one of the bins is located in the array.

3. The lottery ticket dispenser array as in claim 1, wherein the printer module further comprises a scanner.

4. The lottery ticket dispenser array as in claim 1, wherein the electronic drive mechanism in each of the bins and the printer module are controlled by a common controller.

5. The lottery ticket dispenser array as in claim 4, wherein the controller is in communication with each of the electronic drive mechanisms to initiate a dispense sequence for a scratch-off lottery ticket from one or more of the bins, and the controller is in communication with the printer module to initiate printing of an on-demand lottery ticket.

6. The lottery ticket dispenser array as in claim 5, wherein the controller comprises an input device for manual entry of a ticket dispense command to one or more of the bins or to the printer module.

7. The lottery ticket dispenser array as in claim 5, wherein the controller is configured on the frame.

8. The lottery ticket dispenser array as in claim 7, wherein the controller is variably positional relative to the frame between different operational positions.

9. The lottery ticket dispenser array as in claim 8, wherein the controller is slidable along a bottom member, top member, or side member of the frame between the different operational positions.

10. The lottery ticket dispenser array as in claim 9, wherein the controller and printer module are in communication with a central lottery server.

* * * * *